Oct. 12, 1954
C. A. FLOOD
STRING CLIP
2,691,198
Filed April 3, 1951
2 Sheets-Sheet 1
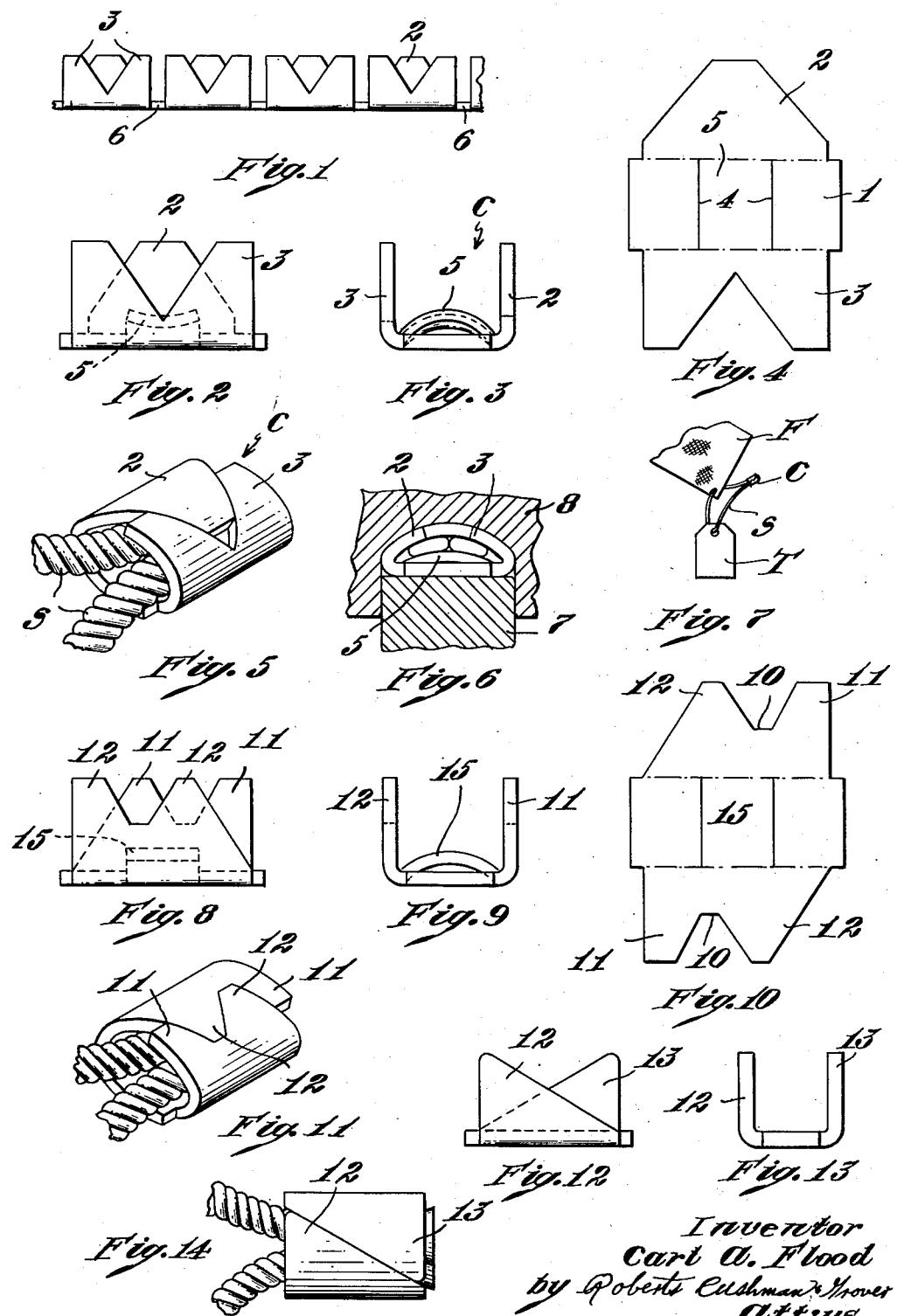

Oct. 12, 1954 — C. A. FLOOD — 2,691,198
STRING CLIP
Filed April 3, 1951 — 2 Sheets-Sheet 2

Inventor
Carl A. Flood
by Roberts, Cushman & Grover
Attys

Patented Oct. 12, 1954

2,691,198

UNITED STATES PATENT OFFICE 2,691,198

STRING CLIP

Carl A. Flood, Framingham, Mass., assignor to Dennison Manufacturing Company, Framingham, Mass., a corporation of Massachusetts Application April 3, 1951, Serial No. 219,090

7 Claims. (Cl. 24—123)

For the purpose of interconnecting two or more strands it has been proposed to clamp the strands together with a sheet metal strip which is ductile enough to be bent easily but which will clamp the strands tight enough to hold them together. An example of such a clip is disclosed in my prior Patent No. 2,056,180, granted October 6, 1936. As there shown it has been customary to make such clips from flat wire stock, the clips being uniform in width throughout their length and of uniform length throughout their width so that, when the ends of the clip are folded over opposite sides of the strands, the ends of the clip substantially abut in a plane parallel to the strands. While these clips have been very useful they sometimes fail to secure the strands securely together; if the strands are pinched too tightly they may be crushed and break, and if they are pinched too loosely they pull out of the clip accidentally.

Objects of the present invention are to provide a clip which will hold the strands securely, which will prevent the strands from slipping through the crack between the abutting ends of the folded clip, which will not damage the strands, which will prevent the strands from pulling out endwise, which pinches the strands uniformly, which requires only a small force to grip the strands, which is simple and economical, and which is convenient and reliable in use.

In one aspect the present invention involves a clip formed of ductile material and comprising a body for engagement with one side of the strands and arms to be folded over the opposite side of the strands, the side of the body which engages the strands having a ridge extending cross-wise of the strands, thereby to pinch the strands securely when the arms are folded as aforesaid. The ridge is preferably formed by arching the body transversely of the strands and preferably the arch is transversely concave so that the edges of the arch pinch the strands. The body may be slit cross-wise and the edge of one side of the slit offset relatively to the edge on the other side. In the preferred embodiment the body is provided with two transverse slits and the portion between the slits is bent up to form the aforesaid arch.

In another aspect of the invention the ends of the arms are shaped to overlap edge-wise but not flat-wise. This is preferably accomplished by forming the ends of the arms with complementary shapes so as to interfit with each other when folded as aforesaid. In the preferred embodiment the end of one arm has a central recess which flares outwardly and the end of the other arm tapers outwardly so as to interfit with the recess when the arms are folded over the strands.

For the purpose of illustration typical embodiments are shown in the accompanying drawings in which Fig. 1 is a side elevation of a strip of clips;

Fig. 2 is a side elevation of a single clip viewed from the same side as in Fig. 1;

Fig. 3 is an end elevation;

Fig. 4 is a plan of the blank from which each clip is formed;

Fig. 5 is an isometric view of a clip applied to two strands;

Fig. 6 is a transverse section showing dies for clamping a clip to strands;

Fig. 7 shows a ticket attached to a piece of fabric by means of a strand having its ends interconnected by one of the clips;

Figs. 8, 9, 10 and 11 are views like Figs. 2, 3, 4 and 5 showing a modification;

Figs. 12, 13 and 14 are similar views of another modification;

Figure 15:
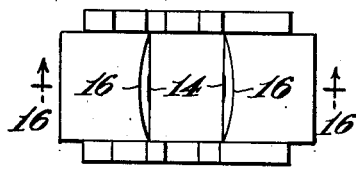
Fig. 15 is a plan view of another embodiment.

The particular embodiment of the invention shown in Figs. 1 to 7 comprises a clip having a body portion 1 and two arms 2 and 3 projecting from the sides of the body portion. As shown in Fig. 4, the body portion has two transverse slits 4 defining an intermediate portion 5. As shown in Fig. 3, the arms are bent up at right angles and the central portion of the body is arched transversely of the clip. As shown in Fig. 2, the arch 5 is bent transversely with its concave side engaging the strands so that the edges bite into the strands and hold them more securely when the arms are folded over. The clips are preferably formed in strip form, as shown Fig. 1, with the body portions integrally interconnected at 6.

To apply one of the clips the strands are laid over the arch and the arms are folded into interlocking relationship by means of male and female dies 7 and 8. After the clip is applied in this way the arms 2 and 3 overlap edge-wise but not flat-wise. Inasmuch as they interlock edgewise there is no danger of the strands pulling out through the crack between the ends of the arms, and inasmuch as they do not overlap flat-wise there is no more than one layer of metal on any side of the strands. One use of the clip is illustrated in Fig. 7, where F is a piece of fabric, T is a ticket and C is one of the clips. A suitable device for applying the clips is disclosed in my copending applications Serial No. 254,147, filed October 31, 1951 and Serial No. 280,520, filed April 4, 1952, now Patent No. 2,626,393, issued January 27, 1953. While the clips may be delivered to the user in the flat form shown in Fig. 4 they are preferably delivered in the form shown in Fig. 1.

The modification shown in Figs. 8 to 11 differs from the first embodiment in that each arm has a recess 10 and two tongues 11 and 12, the ends of the arms being complementary so that they interfit as illustrated in Fig. 11. While the arch 15 is not concave transversely it will be understood of course that it could be thus shaped if desired.

In the modification shown in Figs. 12 to 14 the ends of the arms are beveled in opposite directions so as to abut along a line oblique to the strands and the arch is omitted.

Figure 16:
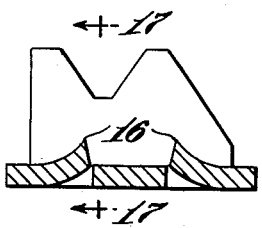
Fig. 16 is a section on line 16—16 of Fig. 15.
Figure 17:
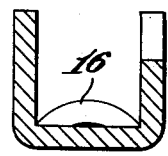
Fig. 17 is a section on line 17—17 of Fig. 16.
Figure 18:
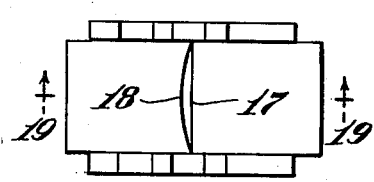
Fig. 18 is a plan of another embodiment.
Figure 19:
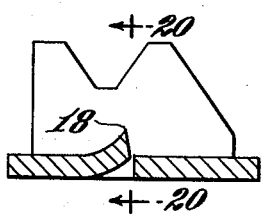
Fig. 19 is a section on line 19—19 of Fig. 18.
Figure 20:
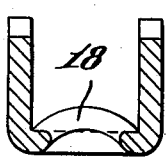
Fig. 20 is a section on line 20—20 of Fig. 19.
Figure 21:
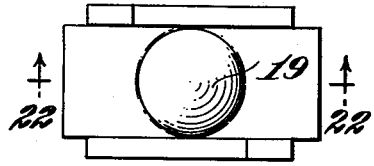
Fig. 21 is a plan of another embodiment.
Figure 22:
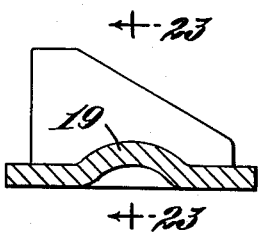
Fig. 22 is a section on line 22—22 of Fig. 21.
Figure 23:
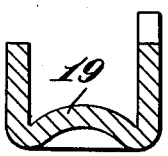
Fig. 23 is a section on line 23—23 of Fig. 22.
Figure 24:
Fig. 24 is an end elevation of any one of the clips, except the one shown in Figs. 12, 13 and 14, with the legs of the clip clinched over without any strands in the clip.

The modification shown in Figs. 15 to 17 is like that shown in Figs. 1 to 7 in that it has two slits 14 corresponding to the slits 4 in Fig. 4. However instead of having the inner edges of the slits arched as at 5 in Figs. 2, 3 and 6, the outer edges 16 are arched. The embodiment shown in Figs. 18 to 20 is like that shown in Figs. 15 to 17 except in that it has only one slit 17 with one side 18 arched as aforesaid. In the embodiment shown in Figs. 21 to 23 the face of the clip is arched in both directions in the form of a dimple 19.

Figure 25:
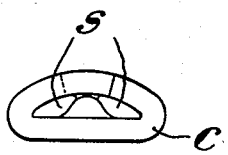
Fig. 25 is a similar view with the two strands at opposite sides of the clip.
Figure 26:
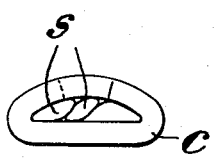
Fig. 26 is a similar view with the two strands at the same side of the clip.
Figure 27:
Fig. 27 is a similar view with the two strands in the middle of the clip.

In each embodiment in which the base is arched the degree of arching is preferably such that when the legs of the clip are clinched over in the tool in which the clips are intended to be used the legs of the clip come substantially in contact with the arch without substantially depressing the arch when there are no strands in the clip. Thus when the legs are clinched over to the same extent with strands in the clip the arch is depressed a distance equal to the thickness of the compressed strands. If the strands are located on opposite sides of the clip they depress the arch at the opposite sides without substantially depressing it in the middle, as shown in Fig. 25. If both strands are on one side the arch is depressed at one side without being substantially depressed at the other side, as shown in Fig. 26. If both strands are in the middle the arch is depressed in the middle without being substantially depressed at the sides, as shown in Fig. 27.

From the foregoing it will be understood that the clips of the present invention hold the strands securely with an optimum degree of pressure determined by the flexibility of the aforesaid arches, whereby the strands are held from slipping accidentally without danger of crushing the strands. It will also be understood that it is advantageous to have a small contact area between the clip and strands, as shown in Figs. 25 to 27, so as to concentrate the pressure and thereby hold the strands more firmly. In this connection it will be understood that while the strands may be clinched without indenting the arch, as shown in Fig. 6, preferably the legs of the clip are clinched over to the position shown in Figs. 24 to 27 so that the arch is depressed as shown in one of the Figs. 25 to 27.

While the transverse dimension of the arch may correspond to that of the clip preferably it is considerably less, as shown in Figs. 1 to 7. For example the clip shown in Figs. 12 and 13 might be arched with the curved dimension of the arch extending from side to side of the clip as in Fig. 3 and the width of the arch extending from end to end of the clip without any slit in the base of the clip.

It should be understood that the present disclosure is for the purpose of illustration only and that this invention includes all modifications and equivalents which fall within the scope of the appended claims. For example any one of the aforesaid clips may be formed separately or in strip form as illustrated in Fig. 1. When formed in strips they may be fed by engagement with any one of the transverse shoulders of each clip through an attaching device such as shown for example in Patents Nos. 2,063,917 and 2,119,228, and said copending applications. However they are preferably fed by engagement with the shoulders formed by the transverse slits such as 4 in Fig. 4 and 14 in Fig. 15. In each embodiment the exposed corners may be square as in Figs. 1 to 11 or rounded as in Fig. 14.

I claim:

1. For clamping together a plurality of strands a clip comprising a body formed of ductile material and adapted for engagement with one side of the strands and arms to be folded over the opposite side of the strands, the side of the body which engages the strands having a flexible ridge extending crosswise of the strands, said ridge being disposed between said arms so that when folded over as aforesaid the arms overlap the ridge to compress the strands between the arms and the ridge, the space behind the ridge being unobstructed so that the ridge may be depressed when the strands are compressed substantially more than enough to clamp the strands together.

2. For clamping together a plurality of strands a clip comprising a body formed of ductile material and adapted for engagement with one side of the strands and arms to be folded over the opposite side of the strands, the body having a slit extending crosswise of the strands and the edge on one side of the slit being offset relatively to the edge on the other side thereby to form a flexible ridge, said ridge being disposed between said arms so that when folded over as aforesaid the arms overlap the ridge to compress the strands between the arms and said edges of the ridge, the space behind the ridge being unobstructed so that the ridge may be depressed when the strands are compressed substantially more than enough to clamp the strands together.

3. For clamping together a plurality of strands a clip comprising a body for engagement with one side of the strands and arms to be folded over the opposite side of the strands, the body being slit crosswise of the strands to form a flexible arch on the strand side and the arch being transversely concave on the strand side, said arch being disposed between said arms so that when folded over as aforesaid the arms overlap the arch to compress the strands between the arms and the arch, the space behind the ridge being unobstructed so that the ridge may be depressed when the strands are compressed substantially more than enough to clamp the strands together.

4. For clamping together a plurality of strands a clip comprising a body formed of ductile material and adapted for engagement with one side of the strands and arms to be folded over the opposite side of the strands, the body having two slits extending crosswise of the strands and the portion between the slits being arched toward the strand side thereby to form a flexible arch, said arch being disposed between said arms so that when folded over as aforesaid the arms overlap the arch to compress the strands between the arms and the arch, the space behind the ridge being unobstructed so that the ridge may be depressed when the strands are compressed substantially more than enough to clamp the strands together.

5. For clamping together a plurality of strands a clip comprising a body formed of ductile material and adapted for engagement with one side of the strands and arms to be folded over the opposite side of the strands, the body being slit crosswise of the strands to form a flexible arch on the strand side, the arch being transversely concave on the strand side and the ends of said arms being shaped to overlap edge-wise but not flat-wise, said arch being disposed between said arms so that when folded over as aforesaid the arms overlap the arch to compress the strands between the arms and the arch, the space behind the ridge being unobstructed so that the ridge may be depressed when the strands are compressed substantially more than enough to clamp the strands together.

6. For clamping together a plurality of strands a strip of clips formed of ductile material and comprising a series of body portions integrally interconnected end to end and an integral arm on each side of each body portion, the side of each body portion which engages the strands having a transverse flexible ridge and the arms being long enough to meet when folded over the body portions, the space behind the ridge being unobstructed so that the ridge may be depressed when the strands are compressed substantially more than enough to clamp the strands together.

7. For clamping together a plurality of strands a strip of clips formed of ductile material and comprising a series of body portions integrally interconnected end to end and an integral arm on each side of each body portion, each body portion having a flexible transverse arch and each arch being transversely concave and the arms being long enough to meet when folded over the body portions, the space behind the ridge being unobstructed so that the ridge may be depressed when the strands are compressed substantially more than enough to clamp the strands together.

References Cited in the file of this patent

UNITED STATES PATENTS

| Number | Name | Date |
|---|---|---|
| 745,036 | Brooks | Nov. 24, 1903 |
| 1,517,670 | Dietze | Dec. 2, 1924 |
| 1,789,951 | Terrell et al. | Jan. 20, 1931 |
| 1,946,713 | Rowley | Dec. 13, 1934 |
| 2,288,918 | Parker | July 7, 1942 |
| 2,314,814 | Borland | Mar. 23, 1943 |
| 2,501,870 | Malhiot | Mar. 28, 1950 |
| 2,554,813 | Buchanan | May 29, 1951 |

FOREIGN PATENTS

| Number | Country | Date |
|---|---|---|
| 398,741 | Great Britain | Sept. 21, 1933 |